March 2, 1937. L. M. SCOFIELD 2,072,469
CAFÉ ROYALE MAKING DEVICE
Filed Sept. 11, 1935

INVENTOR,
LYNN M. SCOFIELD.
By Martin P. Smith, Atty.

Patented Mar. 2, 1937

2,072,469

UNITED STATES PATENT OFFICE 2,072,469

CAFÉ ROYALE MAKING DEVICE

Lynn M. Scofield, Los Angeles, Calif.

Application September 11, 1935, Serial No. 40,071

4 Claims. (Cl. 99—236)

My invention relates to a device for producing the beverage commonly known as café royale and which is a combination of coffee and burned brandy and the principal object of my invention is, to provide a relatively simple, practical and inexpensive device that includes a support for sugar and spices and a container for brandy, which device is positioned in a cup or other container so as to conveniently burn the brandy that is utilized in the beverage and the brandy container being positioned below the sugar supporting element so that the flames from the burning brandy will caramelize and melt the sugar and the device being equipped with a handle whereby it may be conveniently inverted to deposit the burned brandy and melted caramelized sugar into the cup or other container that receives the coffee.

The method usually employed in producing café royale involves the pouring of a small quantity of brandy on the surface of coffee contained within a cup or other receptacle, then burning said brandy and adding sufficient dry sugar to the beverage, but such procedure involves carefulness in pouring the brandy onto the surface of the coffee so that it will form a layer and float thereupon and such procedure also requires separate treatment of the sugar if the same is caramelized before being added to the beverage.

The device contemplated by my invention comprises a one-piece structure that permits café royale to be easily and conveniently prepared and where the devices are constructed for individual service, each person preparing the beverage may use amounts of brandy, sugar, spices and the like to suit the individual taste.

With the foregoing and other objects in view my invention consists in certain novel features of construction and arrangements of parts that will be hereinafter more fully described and claimed and illustrated in the accompanying drawing in which:

Figure 1:
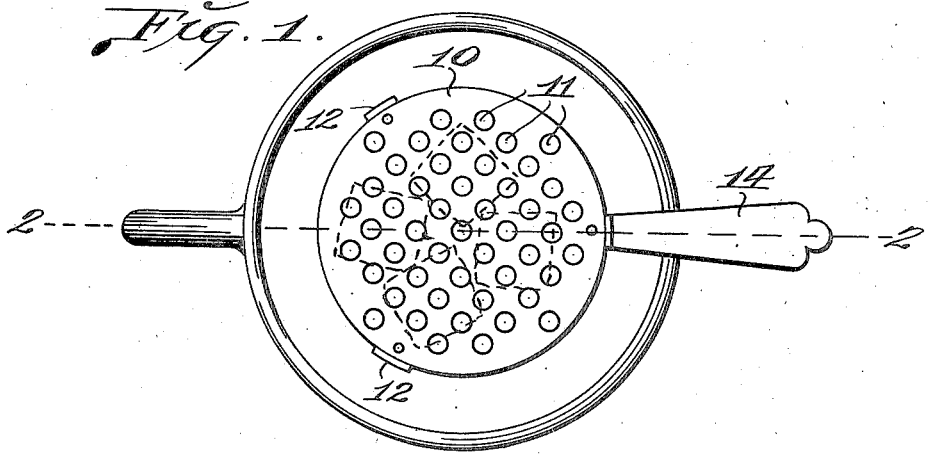
Fig. 1 is a top plan view of a coffee cup and showing the café royale making device positioned therein.
Figure 2:
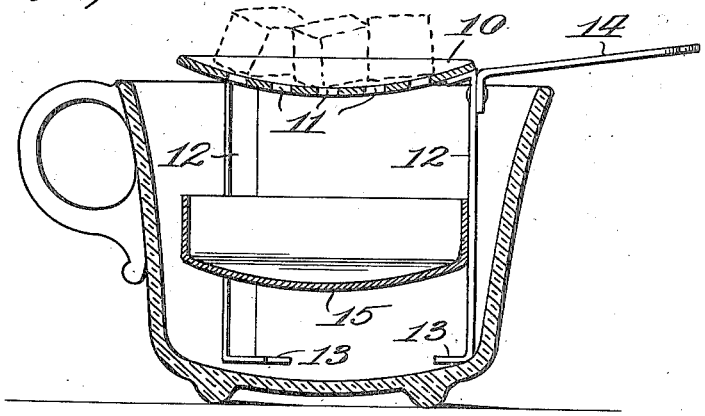
Fig. 2 is a vertical section taken on the line 2—2 of Fig. 1.

Referring by numerals to the accompanying drawing which illustrates a preferred embodiment of my invention, 10 designates a shallow dish-shaped member preferably formed of suitable sheet metal circular in form and provided with perforations 11.

Suitably secured to the underside of this perforated disc adjacent its edge, are the upper ends of vertically disposed legs 12, the lower ends of which are bent inwardly at right angles as designated by 13, in order to provide feet that rest on the bottom of the coffee cup or other container.

Suitably secured to the upper portion of one of the legs and projecting outwardly therefrom, is a short handle 14.

Suitably secured to the legs 12 and positioned a short distance below the perforated disc 10, is a shallow container 15, which serves as a receptacle for the brandy or other liquor, that is utilized in producing the beverage.

In producing café royale with the device just described, two or more lumps or cubes of sugar are placed on the perforated disc 10 and if desired small quantities of powdered cinnamon, nutmeg or other spices or flavoring extracts are sprinkled over the cubes of sugar. Brandy or other liquor is now poured over the sugar, thereby moistening the same and the brandy, after passing through the perforations 11 in the disc 10 passes into container 15.

After the desired amount of brandy has been thus deliverd into the container 15, the brandy is ignited and the flames thereof pass upwardly through the perforations in disc 10 and in a short time the heat from the flames caramelizes and melts the sugar and the latter when melted flows through the apertures 11 and drops into the burning brandy within container 15.

By pouring the brandy over the sugar, the latter is saturated and furnished with a moisture content so that when the same is subjected to the heat of the flames from the burning brandy, the sugar will readily melt and will pass in a soluble state into the brandy.

Obviously as the sugar is thus caramelized and melted the armona of the spices or flavoring extracts sprinkled over the sugar is extracted and blended with the sugar as it passes into the brandy container.

After the sugar has melted and passed into the brandy container, liquid coffee is poured onto the perforated disc and after passing therethrough flows into the brandy container, thereby quenching the flames and after the desired amount of coffee has been poured into the cup through the device, the latter is lifted and at the same time turned upside down so as to discharge the contents of the container 15 into the cup to unite with the coffee in producing the beverage known as café royale.

The size of the apertures in the disc 10 governs the degree of caramelization imparted to the sugar and likewise governs the viscosity of the melted mass as it flows through the apertures and passes into the brandy receptacle 15.

The provision of a separate container for the brandy enables the individual to deliver the desired amount of brandy into said container and provides for the quenching of the flames of the burning brandy at the proper time.

The device in larger sizes may be advantageously employed in making various punches composed of caramelized sugar, spices and dried fruits in combination with alcoholic beverages such as brandy, wine, champagne and the like and particularly where it is not desired to heat the wines. Where punches are prepared with the device, the container 15 permits the isolation of the brandy from the other liquors to produce the desired results.

Figure 3:
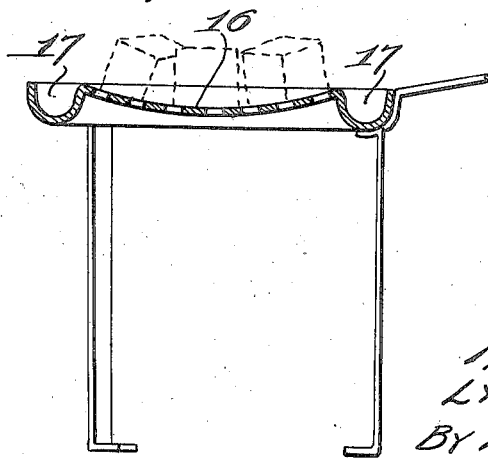
Fig. 3 is a vertical section taken through the center of a modified form of the device.

In Fig. 3 I have illustrated a modified construction wherein the sugar supporting disc 16 has a shallow concave perforated central portion upon which the lumps or cubes of sugar rest and surrounding this perforated central portion is a marginal channel 17 that receives the brandy.

Figure 4:
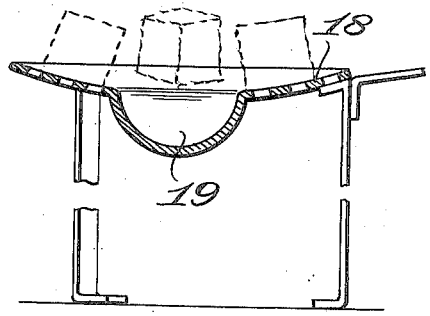
Fig. 4 is a vertical section taken through the center of a further modified form of the device.

In the modified construction illustrated in Fig. 4, the sugar supporting disc 18 is provided with a centrally arranged imperforated cup 19 that receives the brandy and that portion of the disc surrounding the cup is perforated.

Both modified structures just described provide simple and efficient means for caramelizing and melting the sugar by the flames arising from the burning brandy.

Thus it will be seen that I have provided a café royale making device that is relatively simple in construction, inexpensive of manufacture and very effective in performing the functions for which it is intended.

It will be understood that minor changes in the size, form, and construction of the various parts of my improved café royale making device may be made and substituted for those herein shown and described without departing from the spirit of the invention, the scope of which is set forth in the appended claims.

I claim as my invention:

1. In a café royale making device, the combination with a perforated member, of legs secured to and depending from said member and a shallow receptacle secured to said legs beneath said perforated member.

2. A café royale making device, comprising a perforated member, legs depending from said member, a shallow receptacle supported by said legs beneath said perforated member and a handle projecting outwardly from the upper portion of the structure.

3. In a café royale making device, a plate having a perforated portion adapted to support cubes of sugar or the like, said plate having an imperforate portion adapted to contain liquid which imperforated portion surrounds the perforated portion and a handle connected to said plate.

4. In a café royale making device, the combination with a perforated member, of a cup carried by and arranged below said member, which cup is adapted to contain liquid, and a handle secured to and projecting horizontally from said perforated member.

LYNN M. SCOFIELD.